May 21, 1963 G. W. BAIN 3,090,828

SYSTEM FOR LARGE-AREA DISPLAY OF INFORMATION

Filed Aug. 24, 1960 4 Sheets-Sheet 1

INVENTOR.
GEORGE W. BAIN
BY Gust & Irish
ATTORNEYS

INVENTOR.
GEORGE W. BAIN
BY Gust & Irish
ATTORNEYS

May 21, 1963 G. W. BAIN 3,090,828

SYSTEM FOR LARGE-AREA DISPLAY OF INFORMATION

Filed Aug. 24, 1960 4 Sheets-Sheet 3

INVENTOR.
GEORGE W. BAIN
BY Gust & Irish
ATTORNEYS

SYSTEM FOR LARGE-AREA DISPLAY OF INFORMATION

Filed Aug. 24, 1960

*INVENTOR.*
GEORGE W. BAIN
BY Gust & Irish
ATTORNEYS

United States Patent Office 3,090,828
Patented May 21, 1963

3,090,828

SYSTEM FOR LARGE-AREA DISPLAY OF INFORMATION

George W. Bain, Fort Wayne, Ind., assignor to International Telephone and Telegraph Corporation Filed Aug. 24, 1960, Ser. No. 51,666
14 Claims. (Cl. 178—6.6)

This invention relates to a system for presenting alpha-numeric information, i.e., words and numbers and half-tone pictorial information such as photographs, maps, etc., visually on a large area two-dimensional display for group viewing.

There are occasions when it is desirable visually to display various types of printed and/or pictorial information on a large-area surface to permit viewing thereof by a number of persons. In the past, such large-area displays have generally been provided by conventional optical projection techniques which required a darkened room for optimum viewing and further involved substantial power requirements. Furthermore, in instances where the alpha-numeric or other information to be displayed was in the form of coded electrical characteristics, optical projection required the intermediate step of printing the information before projection.

In application Serial Number 18,008 filed Mar. 28, 1960 of Eugene S. Hawkins, which is assigned to the assignee of the present application, there is described and illustrated a system for large-area display of alpha-numeric and graphical information which does not require optical projection techniques. In accordance with that application, a printed page or rectangular graphical display is divided into a matrix comprising a predetermined number of discrete dots, the number depending upon the resolution required, e.g., much in the nature of a newspaper half-tone. Thus, the area to be viewed is divided into incremental areas, such as 1,000 dots horizontally and 1,000 dots vertically to provide a potential of 1,000,000 dots. In order to display the information in dot form, the horizontal dimension of the display surface is divided into a number of discrete incremental segments and one horizontal line of the alpha-numeric or graphical information is formed by sequentially scanning the line and forming dots where marks are required. Thus, the horizontal dot forming mechanism and the display surface are moved vertically with reference to each other as scanning is repeated to form a rectangular display, much in the nature of a television raster. In the above referred to Hawkins application, the display surface is in the form of an endless belt of dielectric material and the dots are formed by well known xerographic techniques.

The system described and illustrated in the aforementioned Hawkins application provides a switching system for sampling the video signal at discrete intervals to determine the presence or absence of a signal thereby to form dots on the display surface in response to the presence of a signal. The switching system disclosed incorporates a pulse generator in conjunction with a pulse counting chain and diode switching matrix to pulse the electrodes which cooperate with the dielectric belt thereby to form an electrostatic charge in dot form thereon. Thus, the system of the Hawkins application is suitable only for two level video, i.e., "on" or "off" type information; the dot forming electrostatic charge or charges on the dielectric belt are not modulated in response to the video information and thus the Hawkins system is not suitable for half-tone pictorial presentation. In addition, the switching system disclosed in the Hawkins application is complex, both structurally and functionally, and more particularly, the failure of any component of the switching system will in effect disable the entire display system.

It is therefore an object of my invnetion to provide an improved system for large-area two-dimensional display of information which incorporates a switching system characterized by its simplicity as compared with the Hawkins system and further which is capable of presenting half-tone pictorial information in addition to alpha-numeric information.

My invention, in its broader aspects, provides means, such as a television camera, for converting the information to be displayed onto a time-based electrical signal. A relatively thin sheet of dielectric material is provided and means including a plurality of electrodes is provided disposed in spaced apart alignment along one dimension of the sheet and cooperating therewith to form incremental electrostatic charges thereon in dot form when said electrodes are respectively energized. Means are provided for moving the sheet with respect to the electrodes along the other dimension thereof and switching means are provided for sequentially coupling the electrodes to the converting means so that the electrodes are respectively energized responsive to the instantaneous level of the time-based signal. Means are provided for applying charged toner material to the sheet following the electrodes in order to render the incremental charges thereon visible. The switching means comprises a plurality of photosensitive switching elements respectively coupling the electrodes to the converting means responsive to impingement of light thereon and means are provided for sequentially scanning the photosensitive means with a beam of light.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
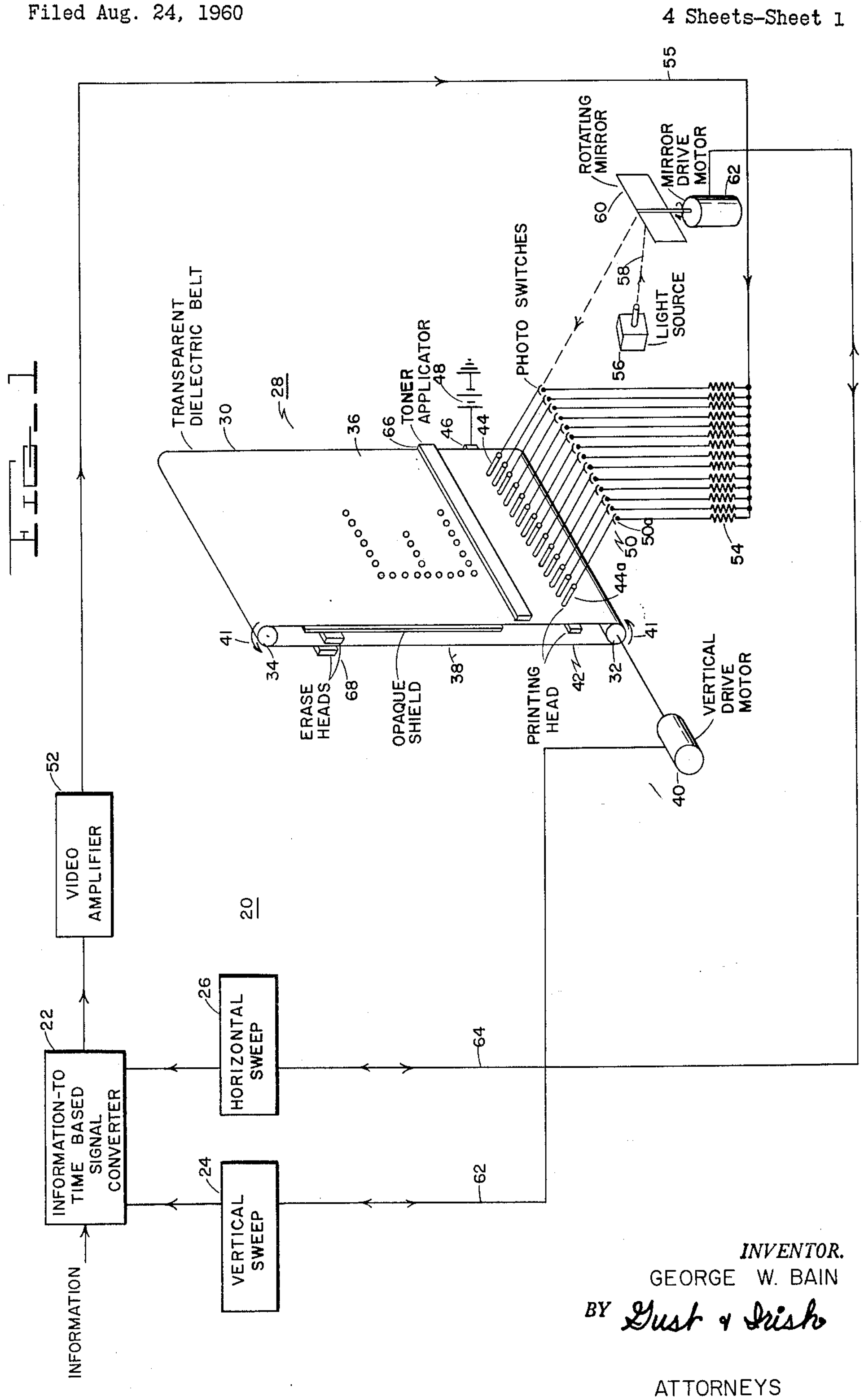
FIG. 1 is a schematic illustration in block diagram form showing the fundamentals of my invention.
Figure 2:
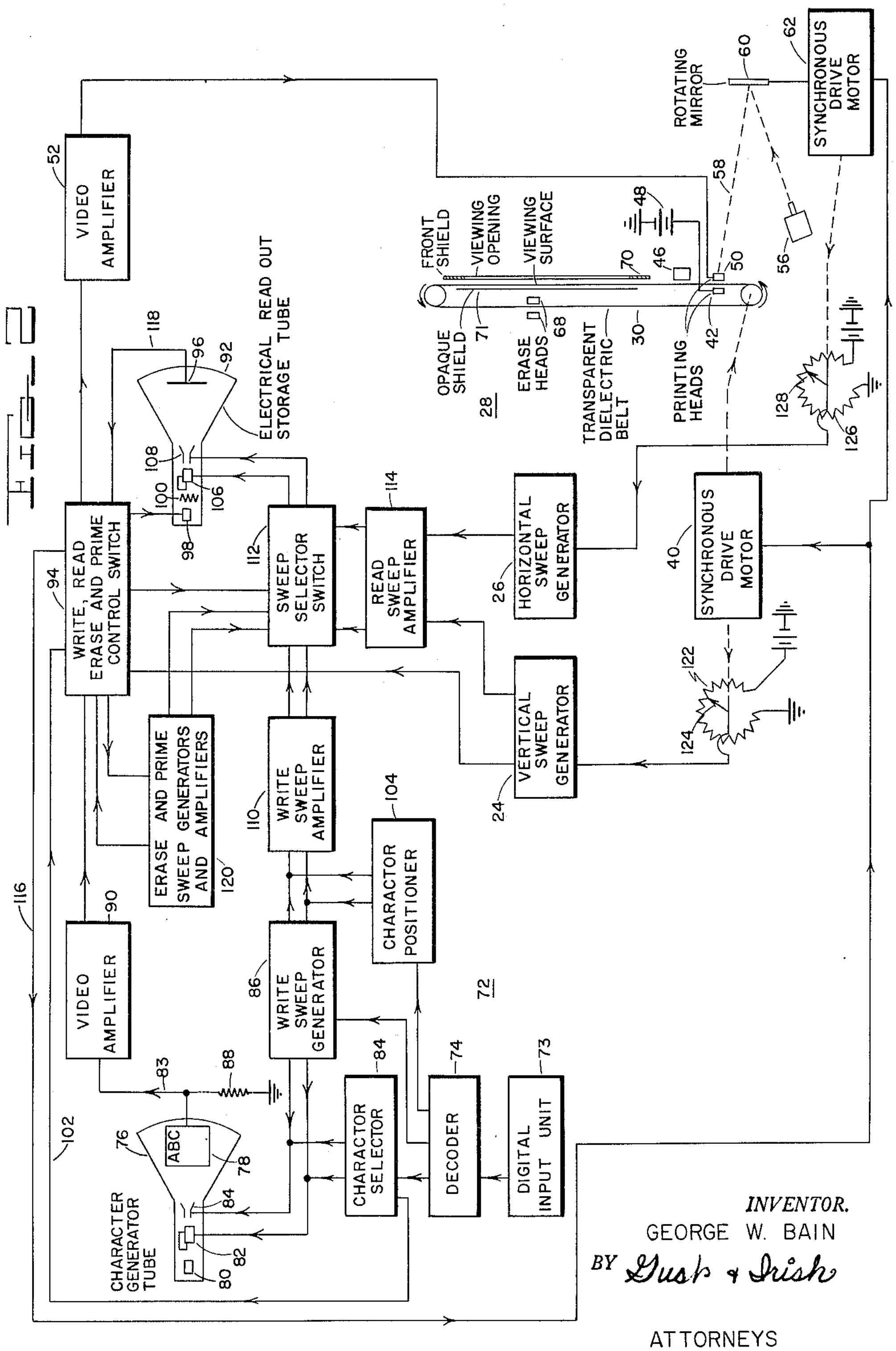
FIG. 2 is a block diagram illustrating one embodiment of my invention for presenting alpha-numeric information.

Referring now to FIG. 1, in which the broader aspects of my invention are illustrated, my improved system for large-area, two-dimensional display of alpha-numeric and/or pictorial information, generally identified at 20, comprises converter 22 which receives the alpha-numeric or pictorial information and converts the same into a time-based electrical signal having characteristics responsive to the received information. Converter 22 includes means for scanning the information in two dimensions, i.e., vertical and horizontal, in raster fashion, and may be a conventional television camera, or an alpha-numeric decoding character generation and storage system as shown in FIG. 2 and described hereinafter. In order to provide the scanning of the input information in two dimensions, vertical sweep generator means 24 and horizontal sweep generator means 26 are coupled to converter 22. If alpha-numeric information is to be displayed, the input information may be in digital form, i.e., a pulsed code from a computer or teletype which is coded as to character and X and Y position and converter 22 will then include means for decoding the digital input to identify the particular characters and their respective locations on the page to be displayed. For alpha-numeric information, converter 22 will also include a character generating device, such as a monoscope tube, for providing a time-based video signal corresponding to the input character. Since the input rate of the system may be considerably faster than the scanning rate, in the case of alpha-numeric information, it may also be desirable to provide storage means in converter 22 to store the character-responsive time-based signals for subsequent reading-out at a slower speed consistent with the capabilities of the printing apparatus.

Large-area display means 28 comprises endless belt 30 of relatively thin dielectric material, such as Mylar, which is trained around rollers 32 and 34 to provide parallel runs 36 and 38, as shown. Lower roller 32 is driven by a suitable drive motor 40, such as a synchronous motor thus to move the belt 30 in the direction shown by the arrows 41.

In order to "print" the information on dielectric belt 30, I provide printing head assembly 42 extending transversely across run 36 of belt 30, i.e., transverse with the direction of movement of the belt. Printing head 42 comprises a plurality of incremental electrostatic charge-forming electrodes 44 in spaced apart alignment and respectively spaced from the outer surface of belt 30, and another elongated electrode 46 extending across the inner surface of belt 30 and spaced therefrom, the elongated electrode 46 cooperating with the plurality of electrodes 44. A suitable source of biasing voltage 48 is connected to the elongated electrode 46 and thus, when the dot-forming electrodes 44 are respectively energized positively, the voltage differential or gradient between the dot-forming electrodes 44 and the elongated electrode 46 on respectively opposite sides of the belt 30 provide incremental electrostatic charges on the belt in dot form.

In order to provide for energizing electrodes 44, I provide a plurality of photosensitive elements 50 respectively connecting the dot-forming electrodes 44 to video amplifier 52 which in turn is coupled to the converter 22. Photosensitive elements 50 thus form switches for connecting respective ones of electrodes 44 to the video amplifier responsive to impingement of light thereon. Thus, if light is impinged upon photosensitive element 50(*a*), electrode 44(*a*) is connected to the video amplifier 52 through current limiting resistor 54 and thus the instantaneous level of the output signal from the video amplifier 52 is impressed upon electrode 44(*a*) thereby forming an incremental electrostatic charge in dot form on belt 30, the magnitude of the charge being proportional to the instantaneous level of the output signal from the video amplifier 52.

In order to provide for sequential energization of electrodes 44 thereby to "print" one horizontal line of information on belt 30, I provide a light source 56 which directs a beam of light 58 onto rotating mirror 60 which in turn directs the beam of light 58 onto the photosensitive elements 50. Rotating mirror 60 is driven by a suitable motor 62, which is a synchronous motor, thereby scanning the beam 58 across photosensitive elements 50, thereby sequentially to cause the same to connect electrodes 44 to the video amplifier 52.

It will be readily apparent that the longitudinal or vertical movement of transverse belt by drive motor 40 corresponds to the vertical scanning of the input information and that the sequential scanning of photosensitive elements 50 by light beam 58 from mirror 60 corresponds to the horizontal scanning of the input information. Thus, it will be seen that drive motor 40 must be synchronized with vertical sweep generating means 24 and to that end, synchronizing coupling 62 is provided between drive motor 40 and vertical sweep generating means 24. Likewise, it will be seen that the horizontal scanning of photosensitive elements 50 by light beam 58 from mirror 60 must be synchronized with the horizontal sweep of the input information, and to that end, a synchronizing connection 64 is provided between the horizontal sweep generator 26 and the mirror drive motor 62.

It will be readily seen that the system may be operated over a wide range of scanning rates from very slow to a rate approaching that of commercial television. The maximum permissible scanning rate will depend on the number of electrodes, the circuit capacity, the current pulse capacity of the photosensitive elements, the voltage available, and the series resistance incorporated; the series resistance is determined by the available charging rate. For normal reading rates for a large area display, the system must be capable of charging the incremental areas of the dielectric belt 30 to several hundred volts in microseconds. Thus, source 48 may be on the order of —100 volts so that any finite level of video signal from the video amplifier 52 in the positive direction above zero when impressed on a respective electrode 44 will produce an incremental charge on belt 30 having a magnitude proportional to the amplitude of the output signal from video amplifier 52.

In order to render the incremental charges thus formed visible, a toner applicator 66 is provided spaced from printing head 42 in the direction of movement of belt 30. Toner applicator 66 applies charged toner material to belt 30 which adheres to the electrostatically charged areas thereby rendering the same visible in accordance with well known xerographic techniques.

It will now be seen that the visual display on the belt 30 is formed a line at a time in raster fashion in synchronism with the scanning of the information received by converter 22. The photosensitive devices 50 may be either photoemissive diodes or photoconductive cells having the proper characteristics, however, it is necessary that the devices have very high dark resistance and low light resistance.

The charging response time of the photosensitive element-printing electrode circuit should be less than the display element time, i.e., the time during which an incremental area of the belt 30 is under an electrode 44, in order that the charging voltage may approach the peak video voltage during that period. The discharge response time should be on the order of one line time or slightly less so that the incremental charge on the belt 30 will not be dissipated by the electrode 44 which formed it before the belt has moved to a new position for the next line. It is further quite important that the lead capacity of the photosensitive switching elements be carefully controlled in order that the charging current requirements be minimized for the photosensitive elements and in turn so that the intensity of the scanning light beam and light source may be held to reasonable levels.

It will be readily seen that as a result of the formation of incremental electrostatic charges on the belt 30 and the application of charged toner material thereto, a visible figure, such as the letter "E" will be formed on run 36 of belt 30, which in the illustrated embodiment is the viewing surface, responsive to the impression of the letter "E" on the signal converter 22. In order to erase the information "printed" on belt 30, a pair of suitable erasing heads 68 are provided cooperating with the back run 38 of belt 30. Erase heads 68 apply a charge on the belt 30 having a polarity opposite from the incremental charges forming the dots, and thus the belt is discharged and the toner material which has been adhered to the incrementally charged areas is brushed therefrom. It will be observed that while a previous page of information is being erased, printing head 42 and toner applicator 66 are operative to begin the formation of a new page of information on run 36. It will be observed that the belt 30 may be stopped when a complete page of information appears on the viewing area 36, or in the alternative, motion of the belt 30 may be continuous and the information continuously printed thereon and subsequently erased therefrom. It will also be readily apparent that it may be desirable to skew the printing head 42 slightly in order that the dots printed thereby on belt 30 may appear horizontally. As best seen in FIG. 2, an opaque front shield 70 may be provided having an opening therein which exposes only the desired display area of front run 36 of belt 30 and a rear opaque shield 71 is preferably provided on the side of belt 30 remote from the opening in the front shield 70.

Referring now to FIG. 2, in which like elements are indicated by like reference numerals, I have shown my invention as being embodied in a system of the type described and illustrated in the aforesaid Hawkins application, the illustrated system being intended for the large-area display of alpha-numeric information. This system, generally identified at 72 comprises input unit 73 which provides input information in digital form, i.e., a pulse code in which the character and the position of the character on the page are included in the coded information. Digital input unit 73 may be a computer, a teletype machine, or a device of the type manufactured by Frieden, Inc., referred to by the tradename "Flex-O-Writer." Digital input unit 73 is coupled to code identifier or decoding unit 74 which separates the character identifying portion of the coded digital input from the position identifying portion. The position identifying portion of the digital input code may merely indicate that the system is to operate in a typewriter mode of operation, i.e., letters printed from left to right, line after line until a full page is completed, or it may identify a particular location or locations on the page for particular characters or symbols.

Generation of the time-based signal responsive to the input characters is accomplished by a character generator tube 76, which in the illustrated embodiment may be a monoscope tube of the type manufactured by Vacuum Tube Products Division, Hughes Aircraft Co. In this tube, sixty-four characters and symbols (letters, numerals, punctuation, etc.) or more, are printed on aluminum target 78 in ordinary printer's ink in horizontal and vertical rows. Tube 76 is provided with electron gun 80 and horizontal and vertical deflection elements 82 and 84 which cooperate to scan the electron beam produced by the gun 80 over the target 78. The time-based output signal corresponding to any preselected character is provided in output circuit 83 of tube 76 by initially positioning the electron beam on the desired character and then scanning the beam over the character in raster fashion.

In order to select the particular character and position the beam thereon, code identifying unit 74 is coupled to character selector unit 84 which in turn is respectively coupled to horizontal and vertical beam deflection elements 82 and 84 of tube 76. Character selector 84 thus converts the character code into corresponding horizontal and vertical deflection voltages, thereby positioning the electron beam from electron gun 80 to the proper location on the target 78 for the particular character called for by the digital code. In order to provide the raster scanning of the particular character, sweep generators 86 are provided coupled respectively to the horizontal and vertical beam deflection elements 82 and 84 of tube 76 providing a delta-X delta-Y sweep voltage respectively superimposed on the position voltages provided by character selector 84. The delta-X delta-Y sweep voltages provided by sweep generators 86 cause the electron beam in tube 76 to be scanned over the particular character selected in a television type raster of sufficient size to cover only the selected character on the target 78.

The electron beam provided by the electron gun 80 has a constant intensity and as it is scanned across the selected character on the target 78, secondary emission current from the target is modulated since the aluminum target and the ink from which the characters are formed exhibit different secondary emission coefficients. Since the target current is equal to the difference between the constant intensity beam current and the varying secondary emission current, the character modulation appears across the output load resistor 88. The character video signal in the output circuit 83 of character generator tube 76 is amplified by video amplifier 90 and applied to the writing signal input circuit of electrical read-out storage tube 92 by write-read-erase and prime control switch 94.

Storage tube 92 is preferably a high resolution electrical output recording storage tube, such as Raytheon type QK–685. Storage tube 92 is necessary in the system of FIG. 2 since the system as thus far described is capable of receiving digital input information at the rate of 30,000 characters per second, or 4,000 characters in 133 milliseconds, whereas ten seconds is required for visual display of 4,000 characters. Thus, a complete page of information containing as many as 4,000 characters can be written into the storage electrode 96 of tube 92 at a very fast rate and subsequently read out at a slower rate compatible with the electrostatic printing apparatus 28.

Operation of the recording storage tube 92 involves priming, writing, reading and erasing. Priming is accomplished by uniform charging storage electrode 96 by reducing the collector screen voltage below the critical potential and scanning the storage electrode 96 in raster fashion with an electron beam provided by electron gun 98. In the writing operation, the bias of control grid 100 is set at cut-off and the signal to be stored is applied. In the reading operation, the control grid bias is set to permit beam current and the storage screen voltage is adjusted so that the storage signal will modulate the beam with the output then being taken from the signal electrode portion of the storage electrode. Erasing operation is performed by writing a direct current signal into the tube, thus normalizing the storage electrode 96 in full modulation level with the signal electrode and the storage screen voltage being the same. The mode of operation of electrical output storage tubes is well known to those skilled in the art, and control of the prime, write, read and erase functions is accomplished in the illustrated embodiment by switching unit 94. Code identifying unit 74 is coupled to switching unit 94 by connection 102 and thus provides a signal thereto at the beginning of the input code group which initiates writing operation of the storage tube 92 which has been previously primed as hereinafter described.

The selected character signals from the character generator tube 76 are written on the storage electrode 96 of the storage tube 92 at a position as determined by the posititon code, as identified by the code identifying unit 74. Code identifying unit 74 is coupled to character positioning unit 104, and if the input digital code indicates the typewriter mode of operation, character positioner unit 104 will provide horizontal and vertical "stair-step" beam deflection voltages for storage tube 92 which will sequentially position the beam provided by gun 98 from left to right and top to bottom. If, on the other hand, the input digital code calls for selective character position at preselected locations on the page, character positioner unit 104 will provide the requisite vertical and horizontal beam for deflection elements 106 and 108 of the storage tube 92 through sweep amplifier 110 and sweep selector switch 112. Sweep selector switch 112 connects deflection elements 106 and 108 of storage tube 92 to character positioning unit 104 during writing operation and to other sweep generating means during reading, erasing and priming operations, as will be described hereinafter. The delta-X delta-Y sweep generators 86 are also coupled to sweep amplifiers 110, and it will thus be seen that the writing beam of storage tube 92 is initially positioned on the storage electrode 96 at the proper position called for by the input digital code and then swept in raster fashion to write the selected character from the character generator tube 76 onto the storage electrode 96. It will be seen that the horizontal and vertical sawtooth or delta-X delta-Y writing sweeps of the electron beam of storage tube 92 provided by electron gun 98 are similar in shape and identical in time to the character scanning sweeps of the character generator tube 76.

Assuming now the typewriter mode of operation, it will be seen that after the first character has been completely written into the storage electrode 96 of storage tube 92, character positioner 104 will advance the line scanning sweep one horizontal step so that another character may be written onto storage electrode 96. This continues sequentially until the complete horizontal line has been written on the storage electrode 96 at which point the horizontal line scanning is returned to its starting point and the page scanning is advanced one step downward. The page scanning continues to advance one line at a time after each horizontal line is completed until the page is finished. The end of the page is indicated in the input digital code, and thus code identifying unit 74 will provide a signal to switch 94 and to character positioner 104 indicating the end of the page so that the writing beam of the storage tube 92 is blanked off, sweep selector switch 112 is actuated to switch from writing to reading operating, and storage tube 92 is changed from writing to reading operation.

Read-out of the stored data on the storage electrode 96 of storage tube 92 is accomplished by scanning the storage electrode 96 with the electron beam from electron gun 98 with a television type raster large enough to cover the entire page of stored information. Linear sawtooth sweep voltages are employed for both the horizontal and vertical scans, the horizontal sweep voltages during reading operation being provided by horizontal sweep generator 26 and the vertical sawtooth voltage being provided by the vertical sweep generator 24. Horizontal and vertical sweep generators 26 and 24 are coupled to the horizontal and vertical deflection elements 106 and 108 of storage tube 92 during reading operation by sweep selector switch 112 and sweep amplifiers 114. Switch 94 is connected to the synchronous drive motor 40 by connection 116 and thus initiates operation of the drive motor to cause movement of the belt 30 when switch 94 changes from writing to reading operation, and terminates operation of driving motor 40 when decoder 74 indicates that a complete page of information has been printed.

The output circuit 118 of storage tube 92 is coupled during reading operation by switch 94 to video amplifier 52. During erasing and priming operation, sweep selector switch 112 and switch 94 couple erase and prime sweep generators and amplifiers 120 to the horizontal and vertical deflection elements 106 and 108 of storage tube 92.

In the illustrated embodiment, synchronous drive motor 40 initiates the vertical synchronizing signal and thus is coupled to rotary potentiometer 122 which in turn has its sliding element 124 coupled to vertical sweep generator 24. Thus, rotation of motor 40 sufficient to drive belt 30 through one frame advances sliding element 124 of potentiometer 122 thereby to cause one complete vertical sweep of the beam of storage tube 92 from the top to the bottom of storage electrode 96 during reading operation. Likewise, the synchronous drive motor 62 which provides the horizontal light scanning of printing head 42 initiates the horizontal synchronizing signal and thus, drive motor 62 is coupled to drive rotary potentiometer 126 which in turn has its sliding element 128 coupled to horizontal sweep generators 26. Thus, each complete scan of photosensitive elements 50 by the light beam 58 responsive to rotation of mirror 60 by drive motor 62 causes one horizontal scanning of the electron beam in tube 92 across storage electrode 96.

It will be seen that actuation of switch 94 from reading to erase and priming operation will, by virtue of connection 116, deenergize both drive motors 40 and 62. Actuation of control switch 94 from reading to erase and prime operation likewise changes sweep selector switch 112 from reading to erase and prime positions, thereby connecting deflection means 106 and 108 of tube 92 to erase and prime sweep generators and amplifiers 120, in order to prepare the tube 92 for writing the next page of information on storage tube 92. On completion of the priming operation, erase and prime sweep generators and amplifiers 120 actuate switch 94 thereby in turn actuating switch 112 to connect deflection means 106 and 108 of storage tube 92 to character positioner 104 and sweep generators 86 in order to write the next page of information onto the storage electrode 96.

Figures 3, 4:
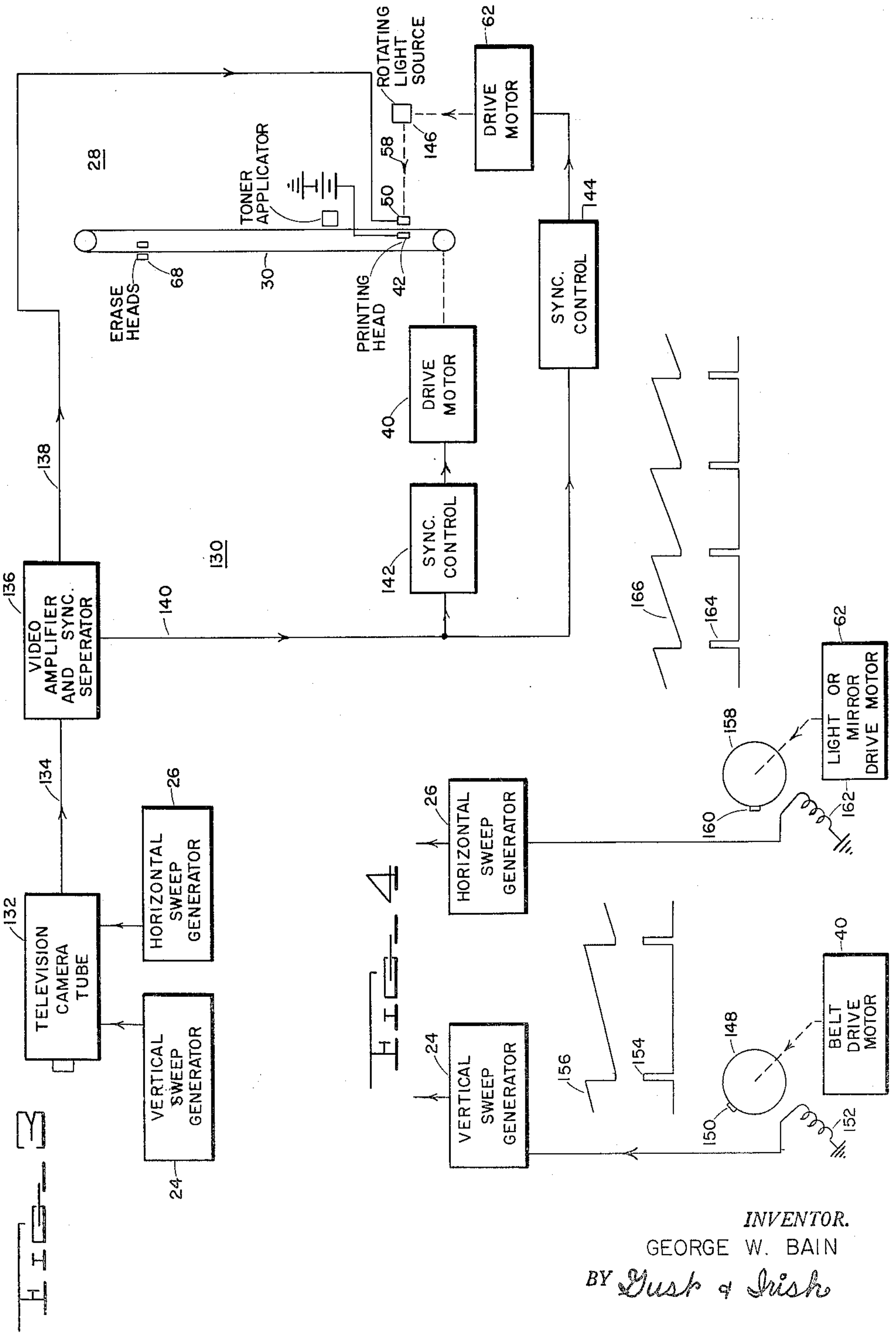
FIG. 3 is a block diagram illustrating an embodiment of my invention for presenting half-tone pictorial information.
FIG. 4 is a fragmentary block diagram illustrating a modification of the system of FIG. 3.

Turning now to FIG. 3 in which like elements are indicated by like reference numerals, there is shown a system incorporating my invention for presenting half-tone information and utilizing a television camera tube as the information converter. Here, the system, generally identified at 130, comprises a conventional television camera tube 132 having vertical and horizontal sweep generators 24 and 26 and conventional synchronizing signal generation circuitry which superimposes line and frame sync signals on the time-based signal in the output circuit 134 of camera tube 132. Output circuit 134 is in turn connected to a conventional video amplifier and sync separator circuit 136 having video output circuit 138 coupled to printing head 42 of electrostatic printing apparatus 28. Here, the line and frame synchronizing signals respectively control the horizontal scanning of the photosensitive elements 50 by light beam 58 and the vertical movement of tape 30 by drive motor 40. Thus, video amplifier and sync separator 136 has a sync signal output circuit 140 connected to sync control circuit 142 which in turn is coupled to drive motor 40 so that the drive motor advances belt 30 one complete frame in response to the scanning of one frame by the camera tube 132, and likewise, sync signal output circuit 140 is coupled to sync control 144 which in turn is coupled to drive motor 62 so that rotating light source 146 is caused to scan light beam 58 across photosensitive elements 50 in response to one line scan of the television camera tube 132. It will be seen that in the system of FIG. 3, the voltages respectively impressed on electrodes 44 by the photosensitive elements 30 are dependent upon the instantaneous light level viewed by the camera tube 132, and thus since the incremental charges formed on belt 30 are voltage dependent, and the amount of toner material which will adhere to each incremental charge depends in turn on the magnitude of the charge, the resulting display will be a half tone.

Referring now to FIG. 4 in which like elements are again indicated by like reference numerals, there is shown a modification of the system of FIG. 3 in which the line and frame synchronizing signals are generated in response to rotation of drive motors 40 and 62. Here, belt drive motor 40 drives a rotatable element 148 which has a slug 150 of magnetic material thereon which cooperates with a pick-up coil 152 which in turn is coupled to trigger vertical sweep generator 24. Rotatable member 148 is arranged to make one complete rotation in response to advance of the belt 30 by one frame and thus each passing of the magnetic slug 150 by the pick-up coil 152 will generate therein a pulse 154, the leading edge of which is employed to terminate the vertical sweep 156 and the trailing edge of which is employed to initiate a new vertical sweep 156. Likewise, a rotatable element 158 is driven by the light or mirror drive motor 62 and has thereon a magnetic slug 160 which cooperates with pick-up coil 162. Again, rotatable member 158 is arranged to be driven through one complete rotation in response to one complete horizontal scanning of light beam 58 by rotating light source 156 and drive motor 62, and thus, each passing of magnetic slug 160 by pick-up coil 162 generates a pulse 164. Pick-up coil 162 is coupled to horizontal sweep generator 26 and the leading edge of each pulse 164 terminates horizontal sweep 166 and the trailing edge thereof initiates a new horizontal sweep.

Figures 5, 6, 7, 9, 10, 11, 12, 13:
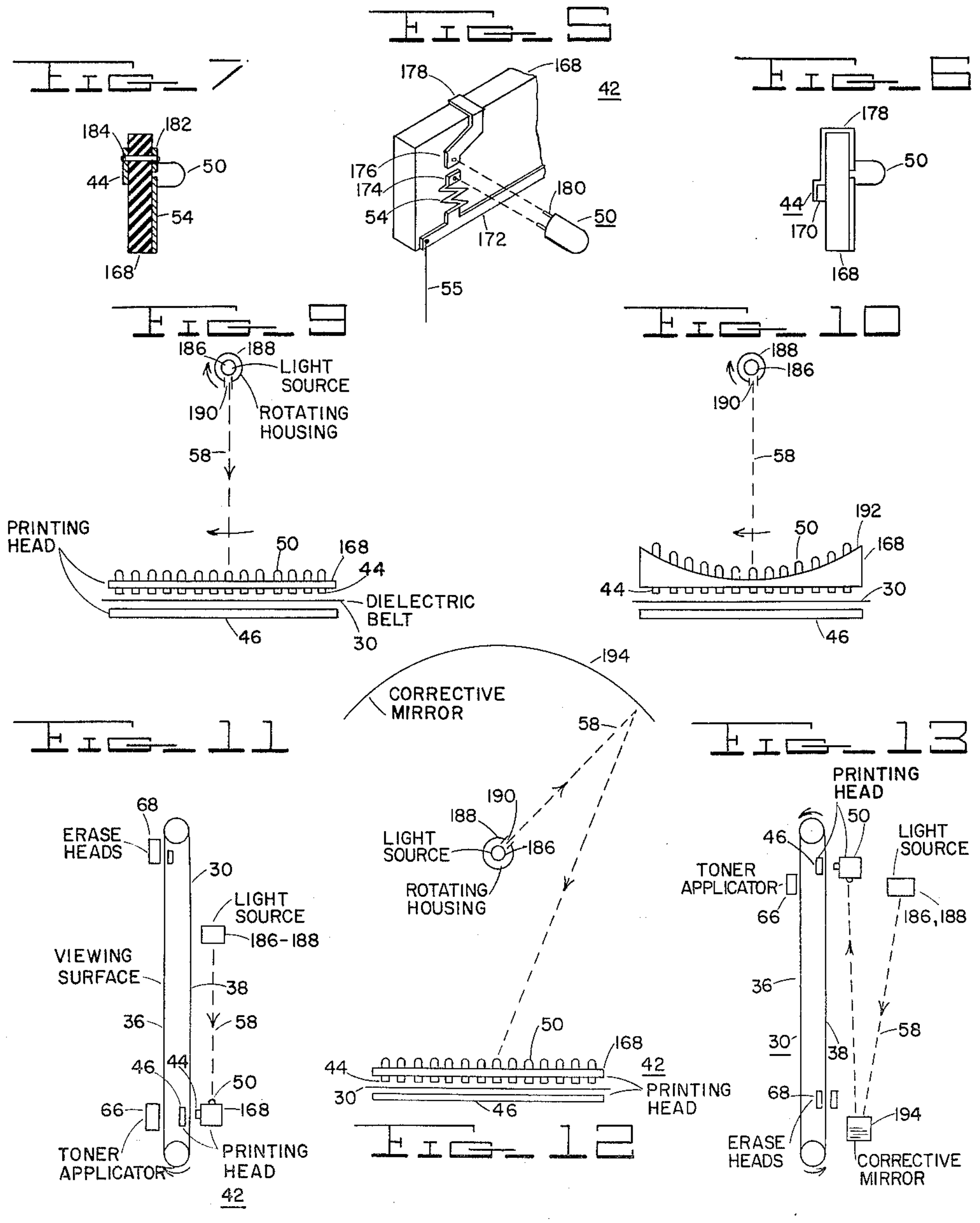
FIG. 5 is a fragmentary view in perspective illustrating one form of printing head employed with my invention.
FIG. 6 is an end view of the printing head of FIG. 5.
FIG. 7 is a cross-sectional view of a modified form of printing head.
FIG. 9 is a schematic view illustrating another light-scanning mechanism in accordance with my invention.
FIG. 10 is a schematic view illustrating a modification of the light-scanning mechanism of FIG. 9.
FIG. 11 is a schematic view illustrating the employment of the embodiments of FIGS. 9 or 10 in the display system of my invention.
FIG. 12 is a schematic view illustrating still another form of light scanning mechanism usable in my invention.
FIG. 13 is a schematic view illustrating the employment of the embodiment of FIG. 12 in the display system of my invention.

Referring now to FIGS. 5 and 6, printing head 42, in accordance with my invention, may include an elongated member 168 formed of suitable insulating material, such as laminated plastic material, with the photosensitive elements 50 and electrodes 44 being respectively disposed on opposite surfaces. Here, a protuberance 170 is provided on one side of member 168 and the electrode 44 is formed as a printed circuit conductor which extends over the top of member 168 and onto the other side, as shown. A common bus 172 is formed as a printed circuit conductor with current limiting resistors 54 again formed as printed circuits elements, being joined thereto, as shown. A connection 55 connects bus 172 to the video amplifier 52. End 174 of the printed circuit resistor 54 and end 176 of printed circuit conductor 178 which is connected to electrode 44 are spaced apart, as shown, and have apertures therein for receiving the pins 180 of photocell 50, as shown. Photocell 50 may be a diode type CE–84 manufactured by Cetron, or a lead sulfide cell.

In FIG. 7, it will be seen that the printed circuit electrode 44 on one side of the insulating member 168 may be coupled to conductor 182 on the other side of the board by a rivet 184 in accordance with common printed circuit board practice.

Referring now to FIG. 9, as suggested in FIG. 3, in lieu of stationary light source 56 and rotating mirror 60, as shown in FIGS. 1 and 2, beam 58 may be scanned across photocells 50 on insulating member 68 by employing a stationary light source 186 with a rotating housing 188 driven by drive motor 62 and having a light aperture 190 therein for projecting the light beam 58 onto the photocells 50. In large displays, in order to prevent the beam 58 in the arrangement of FIG. 9 from impinging upon more than one photocell 50 toward the outer extremities of insulating member 168, it may be found desirable to arrange insulating members 168 so that its surface 192 upon which the photocells 50 are mounted is arcuate, having a radius of curvature centered on the center of light source 186 as shown in FIG. 10.

Referring now to FIG. 11, the light source 186 and rotating housing 188 of FIGS. 3, 9 and 10, or the rotating mirror 60 of FIGS. 1 and 2 may be disposed so that the light beam 58 is scanned in a plane parallel to that of dielectric belt 30, as shown. Thus, it will be seen that the photocells 50 are disposed on a surface of insulating member 168 adjacent the surface upon which the electrodes 44 are formed. While in FIG. 11 the viewing surface 36 of belt 30 is shown as being opposite from the surface 38 upon which the electrostatic charges are formed, the viewing surface may be the same as that shown in the previous figures since the light source or rotating mirror can be disposed above the viewing opening of the front shield 70 and scanning of the light beam 58 is so rapid that it will not interfere with the viewing of the printed information on the surface of belt 30.

Referring now to FIG. 12, the light beam scanning apparatus may be further modified by providing stationary light source 186, rotating housing 188 driven by motor 62 and having aperture 190 therein, and a corrective mirror 194 spaced on the side of light source 186 remote from the printing head 42. In this folded system, the light beam 58 is directed through the aperture 190 of rotating housing 198 onto the curved corrective mirror 194 which in turn reflects the beam onto the photocells 50 on the insulating member 168.

FIG. 13 is a side view showing one physical arrangement of the light scanning system of FIG. 12. As in the case of FIG. 11, printing head 50 is shown as being arranged to form the electrostatic charges on run 38 of belt 30 with toner applicator applying the charged toner material on run 36. However, again, the belt 30 could be operated in the opposite direction with the toner applicator 66 immediately following printing head 50 on run 38 since the scan light beam 58 will not interfere with viewing of the printed information on run 38 of the belt 30. Thus, the belt can be viewed from either side depending upon the location of the erase heads.

Figure 8:
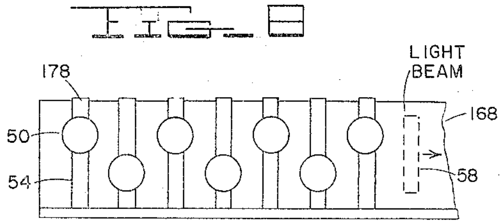
FIG. 8 is a front view of another modified form of printing head in accordance with my invention.

Referring now to FIG. 8, in order to provide a large number of electrodes 44 and photocells 50 in minimum space it will be seen that the photocells 50 may be staggered in order to permit closer spacing thereof, and that the light beam 58 can have an elongated cross-section, as shown in order to scan the staggered photocells 50.

It will be readily comprehended that the location of the light source and/or rotating mirror will be dictated by the geometry of the display, the distortion of the light scanning system, and the optics of the light scanning system. However, in the arrangements shown in FIGS. 11 and 13, in which the light beam 58 is scanned in a plane parallel to the display surface is preferred in order to preserve space. It will also be readily comprehended that the rotating mirror 60 could be multiple faced or the rotating light housing 188 could have a plurality of light apertures 190 therein in order to provide a high scanning rate with a relatively low rotational speed. Current limiting resistors 54 are provided in the circuit so that the photosensitive switches 50 do not necessarily have to be matched, the limiting impedance of the circuit being resistance 54 rather than the switches. For "on" and "off," i.e., black and white presentation, resistors 54 may provide constant current source operation. However, for half-tone presentation, printing must be voltage dependent and thus the resistors 54 must have a relatively low value. Alternatively, a single value of resistance larger than that imposed by any one photoswitch 50 could be added in connection 55 in lieu of the individual resistors 54 or the common driving impedance of the video amplifier 52 could be employed uniformly to limit the current flow in each electrode 44.

It will now be readily seen that my system is characterized by its extreme simplicity both structurally and in operation. It is also seen that components are not interdependent, thus greatly increasing the reliability of the system; the photosensitive switches 50 when used in large numbers are independent of each other so that if one photosensitive switch 50 fails, only one vertical line in the display will be affected. It will further be seen that my system is capable of either half-tone presentation when employed with a pick-up tube, or a two-level video "on" or "off" presentation for alpha-numeric display.

While I have illustrated and described above the principles of my invention in connection with specific apparatus, it is to be clearly understood that this description is made only by way of example and not as a limitation to the scope of my invention.

What is claimed is:

1. A system for large area two-dimensional display of information comprising: means for converting the information to be displayed into a time-based electrical signal; a relatively thin sheet of dielectric material; means including a plurality of electrodes in spaced apart alignment along one dimension of said sheet and cooperating therewith to form incremental electrostatic charges thereon in dot form when said electrodes are respectively energized; means for moving said sheet with respect to said electrodes along the other dimension of said sheet; switching means for sequentially coupling said electrodes to said converting means whereby said electrodes are respectively energized responsive to the instantaneous level of said signal; and means for applying charged toner material to said sheet after it passes said electrodes; said switching means comprising a plurality of photosensitive switching means respectively electrically coupling said electrodes to said converting means responsive to impingement of light thereon; and means for sequentially scanning said photosensitive means with a beam of light.

2. A system for large area two-dimensional display of information comprising: means for converting the information to be displayed into a time-based electrical signal, said converting means including vertical and horizontal means for scanning the information to be displayed in raster fashion; a relatively thin sheet of dielectric material; means including a plurality of electrodes in spaced apart alignment along one dimension of said sheet and cooperating therewith to form incremental electrostatic charges thereon in dot form when said electrodes are respectively energized; means for moving said sheet with respect to said electrodes along the other dimension of said sheet, said moving means being synchronized with said vertical scanning means; switching means for sequentially coupling said electrodes to said converting means whereby said electrodes are respectively energized responsive to the instantaneous level of said signal; and means for applying charged toner material to said sheet after it passes said electrodes; said switching means comprising a plurality of photosensitive switching means respectively electrically coupling said electrodes to said converting means responsive to impingement of light thereon, and means for sequentially scanning said photosensitive means with a beam of light, said sequential scanning means being synchronized with said horizontal scanning means.

3. The combination of claim 1 wherein said scanning means comprises a light source and a mirror disposed to direct said beam of light from said source onto said photosensitive means, and further comprising means for imparting rotational movement to one of said light source and mirror with respect to the other thereby to cause said scanning of said beam of light.

4. The combination of claim 2 wherein said sequential scanning means comprises a stationary light source arranged to project said beam of light, and a rotatable mirror for directing said beam onto said photosensitive means, and further comprising means synchronized with said horizontal scanning means for rotating said mirror thereby to scan said beam over said photosensitive means.

5. The combination of claim 2 wherein said sequential scanning means comprises a rotatable light source arranged to project said beam of light onto said photosensitive means, and further comprising means synchronized with said horizontal scanning means for rotating said light source thereby to scan said beam over said photosensitive means.

6. The combination of claim 2 wherein said sequential scanning means comprises a rotatable light source arranged to project a beam of light, and a stationary curved mirror for directing said beam onto said photosensitive means, and further comprising means synchronized with said horizontal scanning means for rotating said light source thereby to scan said beam over said photosensitive means.

7. A system for large area two-dimensional display of information comprising: means for receiving the information to be displayed; means including vertical and horizontal sweep means for scanning the received information in raster fashion thereby to convert the same into a time-based signal; an endless belt of relatively thin dielectric material trained around at least two rollers and defining a display area therebetween; means connected to one of said rollers for driving said belt longitudinally; first means for synchronizing said driving means with said vertical sweep means; a plurality of closely spaced electrodes disposed in alignment transversely across said belt on one side thereof and an elongated electrode extending transversely across said belt on the other side thereof and cooperating with said plurality of electrodes to form incremental electrostatic charges in dot form on said belt when said plurality of electrodes are respectively energized; means extending transversely across one side of said belt and spaced from said plurality of electrodes in the direction of movement of said belt for applying charged toner material thereto thereby to render said incremental charges visible; a plurality of photosensitive switching means respectively coupling said electrodes to said scanning means responsive to impingement of light thereon whereby said electrodes are respectively energized responsive to the instantaneous level of said signal; means for providing a beam of light; means for sequentially scanning said photosensitive switching means with said beam of light to sequentially energize said electrodes; and second means for synchronizing said sequential scanning means with said horizontal sweep means.

8. The combination of claim 7 wherein said first and second synchronizing means respectively comprise means for generating vertical and horizontal synchronizing signals responsive respectively to movement of said driving means and said sequential scanning means, and means respectively coupling said synchronizing signal generating means to said vertical and horizontal sweep means.

9. The combination of claim 7 wherein said scanning means further includes means for generating synchronizing signals responsive to said horizontal sweep means, and wherein said first and second synchronizing means comprises means respectively coupled to said drive means and to said sequential scanning means for synchronizing the same responsive to said synchronizing signals.

10. The combination of claim 1 wherein said electrodes and said photosensitive means are mounted on an elongated supporting member.

11. The combination of claim 1 wherein said electrodes are mounted on one surface of an elongated supporting member and said photosensitive means are mounted on another surface thereof.

12. The combination of claim 1 wherein said sequential scanning means scans said beam along radii from a point spaced from said photosensitive means, and wherein said electrodes are mounted on one surface of an elongated supporting member and said photosensitive means are mounted on another surface thereof, said other surface being curved with a radius of curvature extending from said point.

13. The combination of claim 1 wherein said electrodes are printed circuit elements formed on one surface of an elongated insulating member and are respectively connected to a first plurality of printed circuit conductors on another surface of said member, wherein another plurality of printed circuit conductors is formed on said other surface of said member each having one end closely spaced from the end of a respective one of said first plurality of printed circuit conductors and having its other end connected to a common printed circuit conductor, said common printed circuit conductor being coupled to said converting means, and wherein each of said photosensitive means is a photosensitive cell having two terminals respectively connected to adjacent ends of respective ones of said first and second pluralities of printed circuit conductors.

14. The combination of claim 13 wherein each of said second plurality of printed circuit conductors has a ballast resistance element in series therewith.

References Cited in the file of this patent

UNITED STATES PATENTS

| | | |
|---|---|---|
| 2,214,013 | Deninson | Sept. 10, 1940 |
| 2,690,394 | Carlson | Sept. 28, 1954 |
| 2,716,826 | Huebner | Sept. 6, 1955 |
| 2,726,940 | Buhler | Dec. 13, 1955 |
| 2,890,633 | Huebner | June 16, 1959 |
| 2,909,973 | Koelsch | Oct. 27, 1959 |